(Model.) 8 Sheets—Sheet 1.
C. WHITNEY & W. W. MARSH.
HARVESTER AND BINDER.
No. 295,510. Patented Mar. 18, 1884.
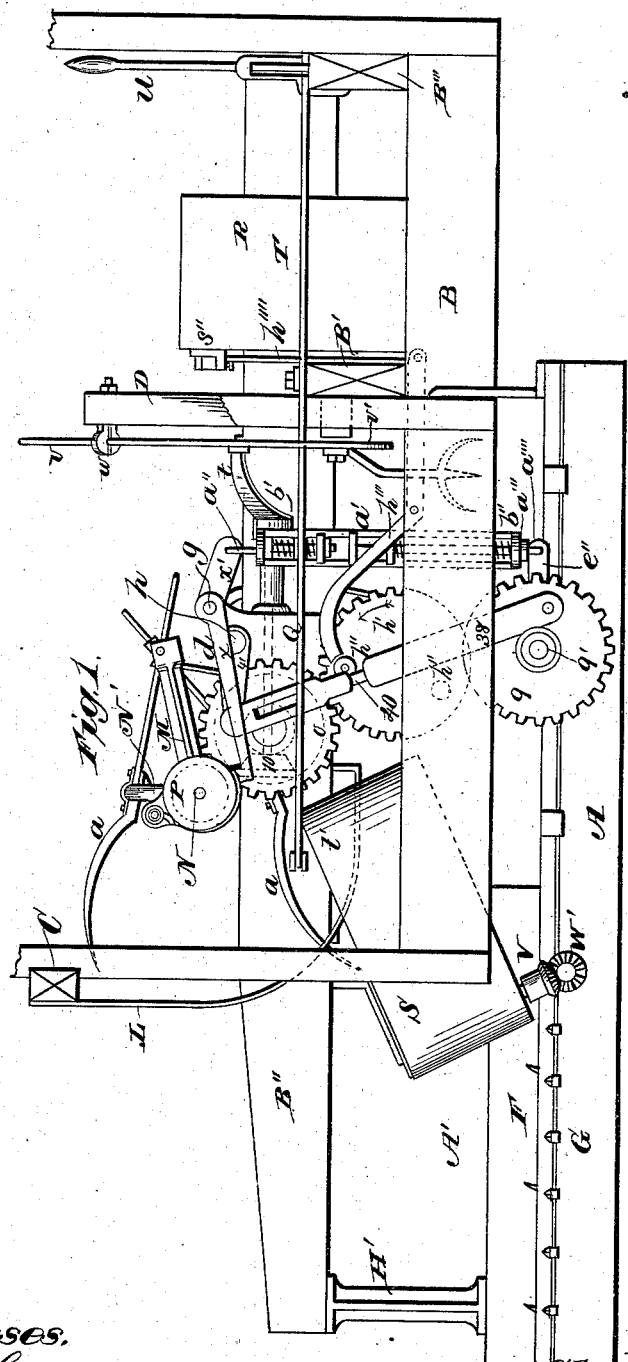
Witnesses.
Robert Everett.
Victor Coombe
Inventors.
Charles Whitney
William W. Marsh.
By James L. Norris.
Atty.

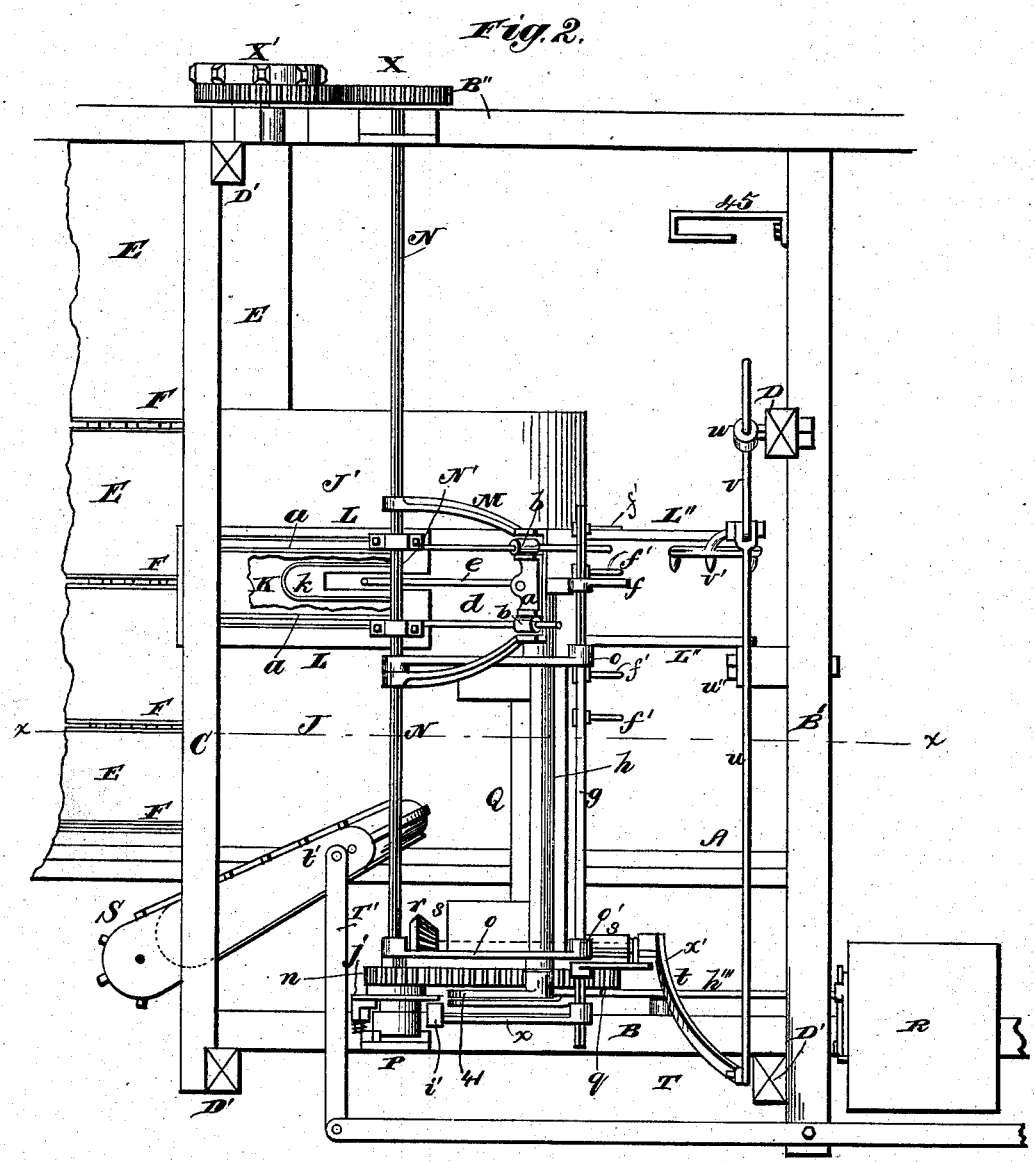

(Model.) 8 Sheets—Sheet 3.
C. WHITNEY & W. W. MARSH.
HARVESTER AND BINDER.
No. 295,510. Patented Mar. 18, 1884.
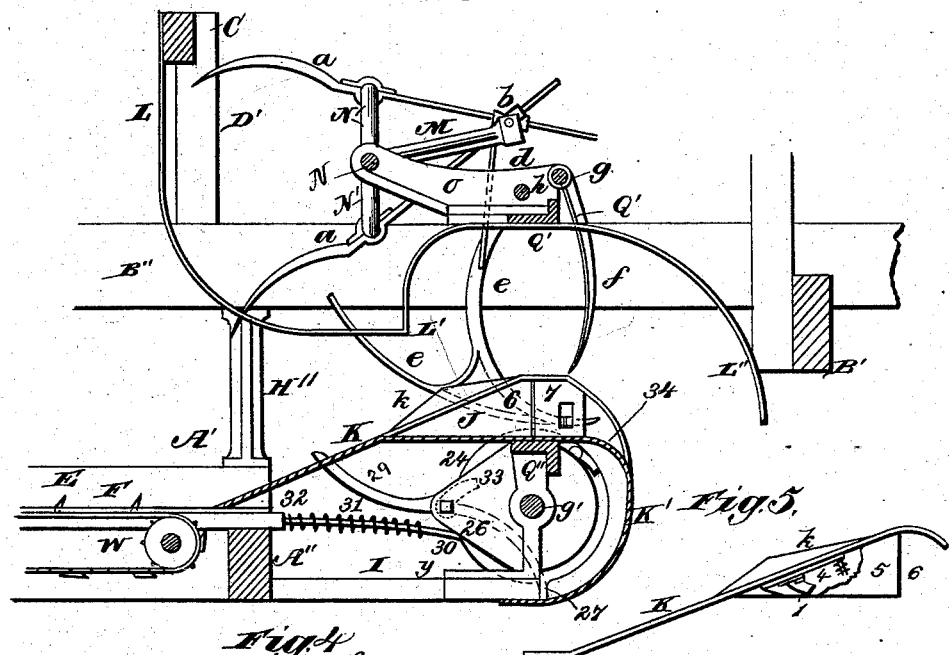
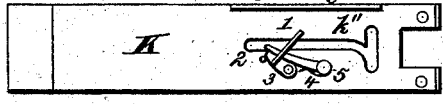
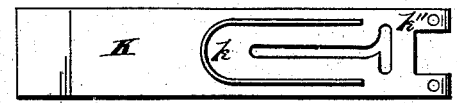
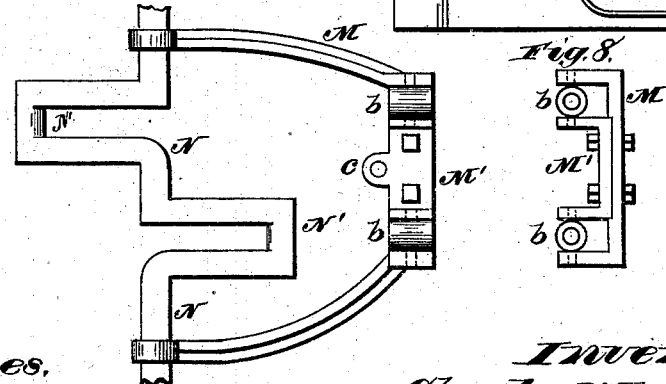
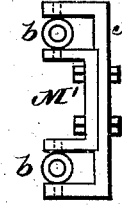

(Model.) 8 Sheets—Sheet 4.
C. WHITNEY & W. W. MARSH.
HARVESTER AND BINDER.
No. 295,510. Patented Mar. 18, 1884.
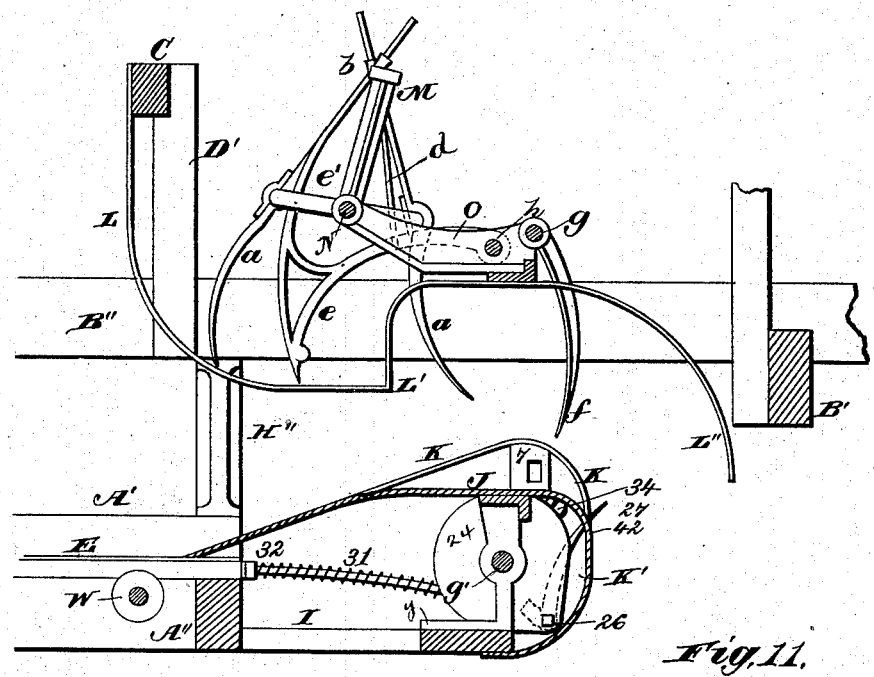
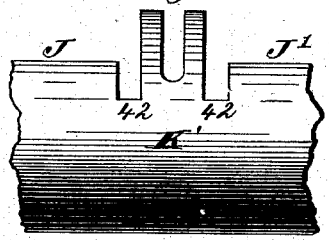
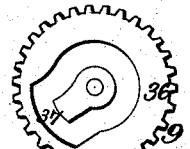
Witnesses.
Robt. Errett.
Vinton Coombe
Inventors
Charles Whitney
William W. Marsh.
By James L. Norris.
Atty.

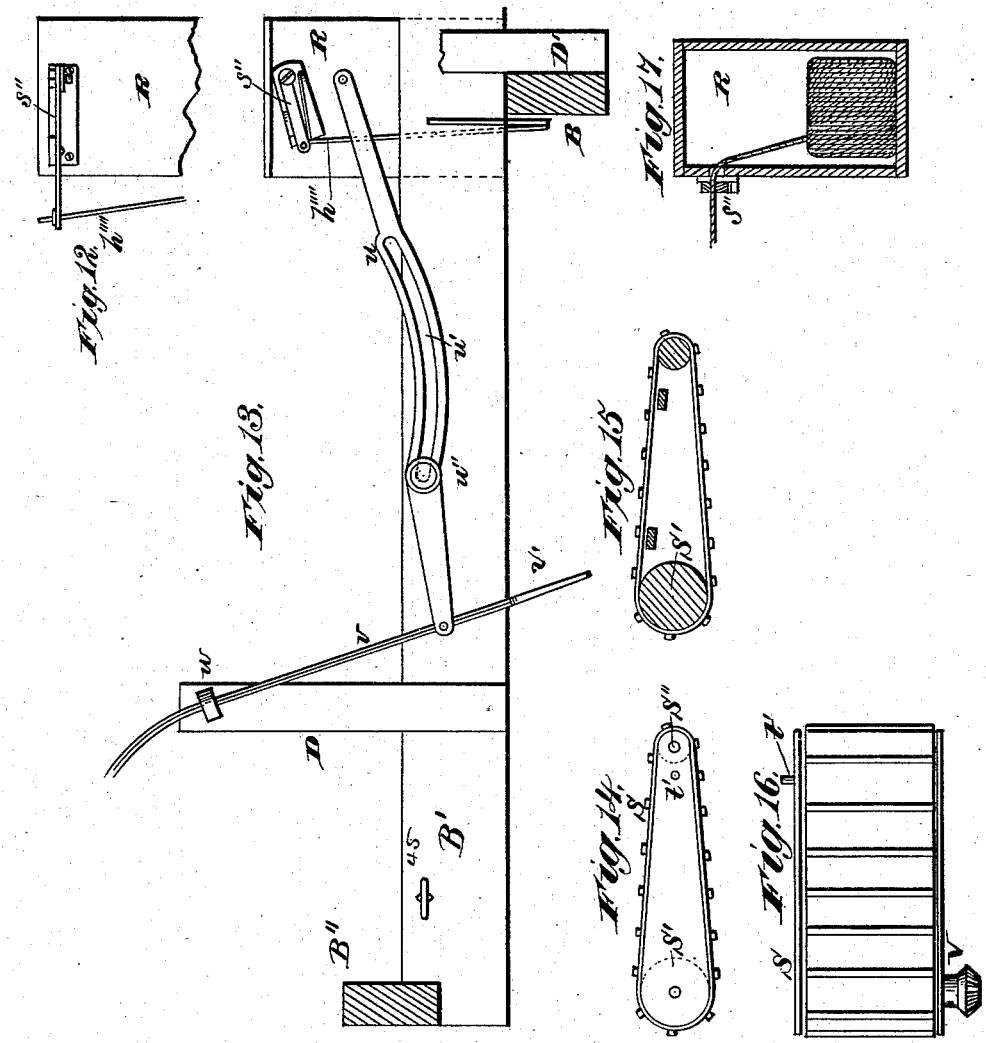

(Model.)

8 Sheets—Sheet 6.

C. WHITNEY & W. W. MARSH.
HARVESTER AND BINDER.

No. 295,510.

Patented Mar. 18, 1884.

Witnesses,
Robert Everett,
Vinton Coombs

Inventors,
Charles Whitney
William W. Marsh.
By James L. Norris.
Atty.

N. PETERS, Photo-Lithographer, Washington, D. C.

(Model.)  8 Sheets—Sheet 7.
C. WHITNEY & W. W. MARSH.
HARVESTER AND BINDER.
No. 295,510.  Patented Mar. 18, 1884.
Fig. 23.
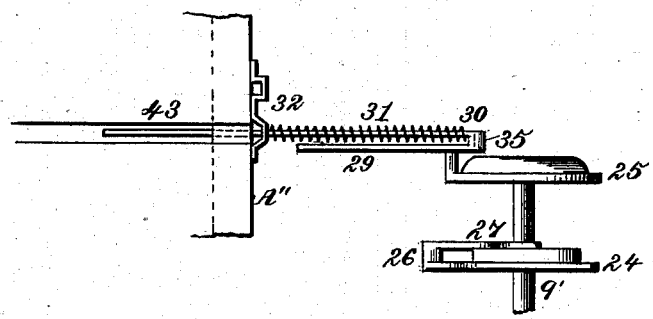
Fig. 23a.
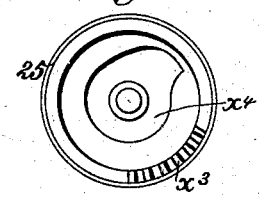
Fig. 24.  Fig. 25.  Fig. 26.
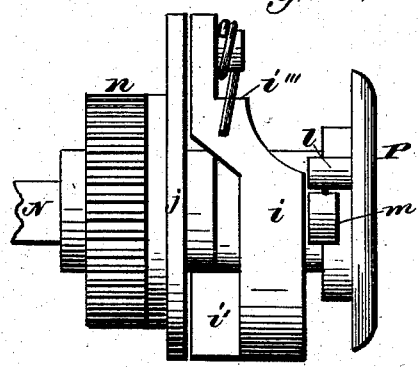 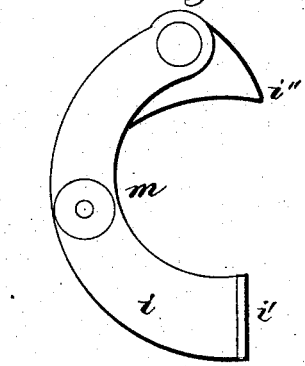 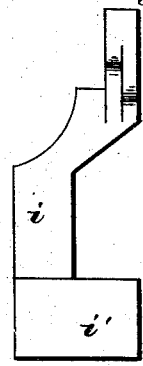
Fig. 27.  Fig. 28.
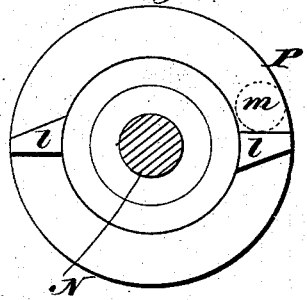
Witnesses.
Robert Everett,
Vinton Coombs
Inventors.
Charles Whitney
William W. Marsh.
By James L. Norris.
Atty.

(Model.) 8 Sheets—Sheet 8.
C. WHITNEY & W. W. MARSH.
HARVESTER AND BINDER.
No. 295,510. Patented Mar. 18, 1884.
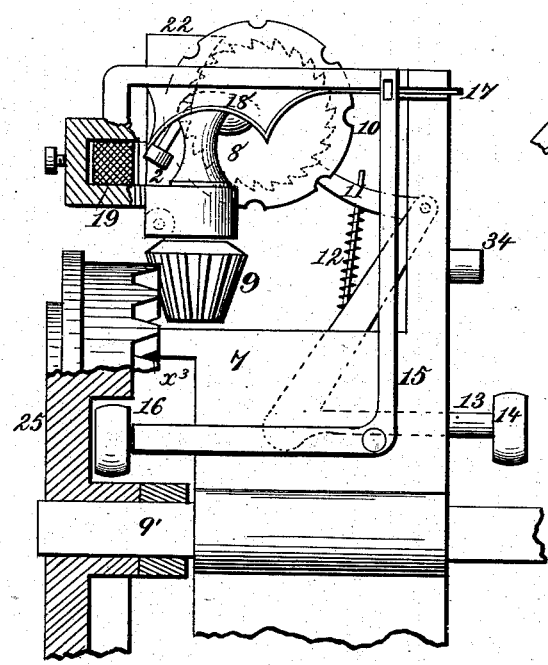
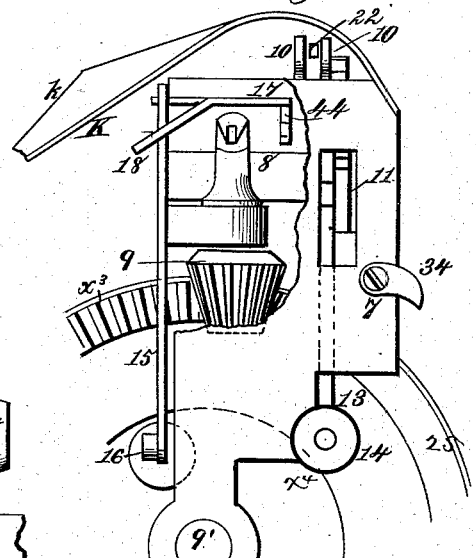
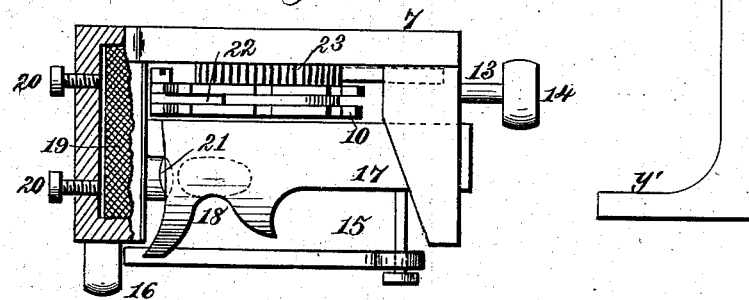
Witnesses.
Robert Everett.
Vinton Coombs
Inventors.
Charles Whitney
William W. Marsh,
By James L. Norris.
Atty.

UNITED STATES PATENT OFFICE.

CHARLES WHITNEY AND WILLIAM W. MARSH, OF SYCAMORE, ILLINOIS.

HARVESTER AND BINDER.

SPECIFICATION forming part of Letters Patent No. 295,510, dated March 18, 1884.

Application filed December 13, 1883. (Model.) Patented in England December 7, 1880, No. 5,088.

*To all whom it may concern:*

Be it known that we, CHARLES WHITNEY and WILLIAM W. MARSH, citizens of the United States, residing at Sycamore, in the county of De Kalb and State of Illinois, have invented new and useful Improvements in Harvesters and Binders, of which the following is a specification.

Figure 18:
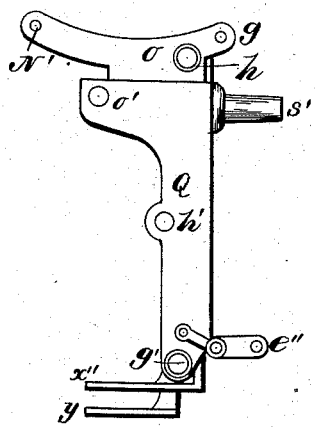
Figure 19:
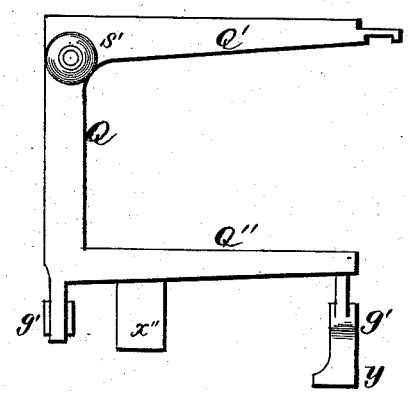
Figure 20:
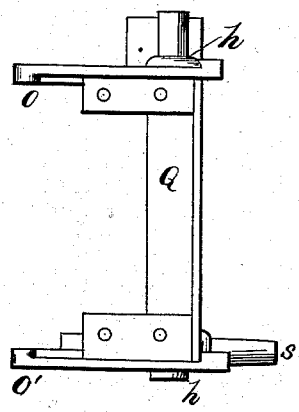
Figure 21:
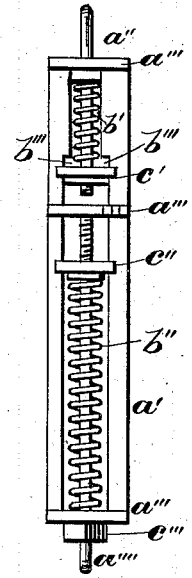
Figure 22:

Figure 1 is a front view; Fig. 2, a plan view.
Fig. 3 is a cross-section on line $x$ $x$ of Fig. 2; Figs. 4, 5, and 6, detached views of the binder-head or covering-plate, which forms the central part of the inclined receiving-platform; Figs. 7 and 8, detached views of the swinging frame or guide for the packing-arms; Fig. 9, a cross-section on line $x$ $x$ of Fig. 2, showing the swinging frame in an elevated position, and the packing-arms down in their working position; Fig. 10, an end or front view of the guard-plate or shield; Fig. 11, an inner view of the wheel $g$, showing the cam-groove; Fig. 12, a view of the cord-box from the inside of the machine, showing the tension device; Fig. 13, a longitudinal section, showing a similar view of the cord-box; also the connecting-link for operating the bundle-discharging fork; Figs. 14, 15, 16, detached views of the swinging butter; Fig. 17, a cross-section of the cord-box; Figs. 18, 19, 20, edge, side, and plan views of the frame supporting the binding device; Figs. 21, 22, detached face and edge views of the link connecting the compressor-shaft with the cam-wheel; Fig. 23, a detached plan view of the wheels on each side of the binder-head for operating the discharging-fingers and binding mechanism. Fig. 23ª shows a side view of wheel 25; Fig. 24, an enlarged view of the catch and pinion on the transmitting-shaft N; Figs. 25, 26, 27, 28, details of the parts shown in Fig. 24; Figs. 29, 30, 31, inner elevation, front elevation, and plan views, respectively, of the binder-head.

The entire machine is not shown. The main wheel, cutting apparatus, and chain driving-gears, the grain end of the platform, the reel, draft-pole, and driver's seat are omitted, they all being of the ordinary well-known forms.

The frame-work of the machine may be of any suitable construction; but, as here shown, it is composed of base or main frame sills A A' A'', and a secondary frame supported above the same. The base-frame carries the grain- platform E, which is slotted for the passage of the chains F, or the teeth thereon, and is also provided with the usual cutting apparatus G. The secondary frame is composed of front and rear rails, B B'', and cross-rails B' B''' C, the latter being elevated on the posts D'. The drive-wheel is located between the cross-rails B' B''', and the secondary frame is supported by the base-frame through the medium of posts H' H''.

The chains F are supported upon the roller-shaft W, at their inner ends, which shaft is driven by the chain which passes over the sprocket-wheel X'. The front end of the shaft W is provided with a miter-wheel, W', which engages with and drives the miter-wheel V, which last-named miter-wheel drives or carries the roller S', upon which the butter-belt S is mounted, and by which it is operated. A similar but smaller roller is placed at the opposite end of the butter. These rollers are mounted in and supported by a small frame, (shown in detail at Figs. 14, 15, 16,) which frame, as shown, is composed of two end boards and two cross-bars, for keeping the end boards in position. Around these two rollers is placed the traveling belt of the butter S, which is provided with cleats or other suitable means for moving the butts of the grain along the fixed platform. This traveling butter may be made of canvas, or of any suitable belting, and, with its frame, is free to turn upon the roller S', or its bearings, so that its upper end may be pushed in or out, as desired, for short or long grain. The butter is capable of being adjusted so as to lie in a line parallel with the receiving-platform, for the purpose of evening long grain; but for short grain the upper end of the butter is thrown inward so as to deflect the grain and carry it along on the platform, whereby the grain is delivered to the binder in such position that the band or cord will be in its proper position on the bundle. By making the butter a traveling one, it crowds the grain over without retarding the butts, and in all cases it keeps the butts up and prevents them from lagging or falling behind or choking at the divider. The moving of the butter is under the control of the driver, by means of the link T, lever or pivot bar T', and hand-lever U.

The receiving-platform, as shown, is made of three parts, J J' K. The central part, K, is the binder-head cap or coverer and carries on the under side the cord-tucking device. At its outer end it is at a higher elevation than the parts of the platform J J', as shown in Fig. 9. This arrangement of the platform raises the middle of the bundle to give it a greater compression at that point, while the heads and butts are left comparatively free to expand or move under compression at the under as well as at the upper sides. At the outer or extreme stubble side of this platform we have provided a shield, K', (shown in elevation at Fig. 10,) and is cut away at 42, to form shoulders for folding the discharging-fingers, and the part opposite the plate K is provided with a slot, through which the binding-arm point passes. The parts J J' K K' are preferably made of sheet metal; but may be made partly of wood, if desired. Overhanging this receiving-platform and attached to the cross-bar C are two guide-bars, L, which are carried down and bent at L', and curved down at L", as shown in Figs. 3 and 9. They are also attached to the arm Q' of the binder-mechanism supporting-frame Q. We have shown two of these arms; but additional ones may be applied, if desired. These bars are bent in the form shown for shielding the binding-arm and packing-fingers at the throat, and are curved upward at L' for the purpose of forming a space for receiving sufficient grain to form a gavel to be bound, and are curved downward at their outer ends, L", to serve as a guide for the bundle, and to hold the bound bundle against the discharging-fingers.

The binder-mechanism supporting-frame Q is cast in the form shown in detail, Figs. 18, 19, 20, and is supported by the foot or bracket $x''$ upon the front sill, A, and by the foot $y$ upon the brace I. The bar I is most conveniently supported by being at an angle supporting its rear end upon the cross-sill A", and its forward end upon the front sill-bar, A, at or near the cross-sill B'; but, if desired, it may be independently supported from the cross-sill A". The upper end of the frame or casting Q is provided with cross-heads O O', which form a support for the shaft N and for the shafts $g$ and $h$. The shaft N extends beyond the cross-head O to the rear cross-sill, B", where it has an additional support or journal, and is provided with the gear-wheel X, which gear-wheel engages with a corresponding gear-wheel upon the back of a sprocket-wheel, X'. The shaft N is provided with double or reverse cranks N'. (Shown in detail in Fig. 7.) These cranks are located over the cap or cover plate K, and operate the packing-fingers $a$.

The swinging guide M is attached to the shaft N, so as to turn freely thereon. This guide is made with arms, as shown at Fig. 7, and a head, as shown at Fig. 8. The head is provided with two pivot or trunnion sockets, $b$, through which the rear ends or extensions of the packing-fingers $a$ pass and slide. This swinging guide M is connected with the binding-arm $e$ by means of a link, $d$, so that the swinging guide will rise or fall with the binding-arm $e$. The binding-arm $e$ carries the cord, by a suitable eye at its point, and is provided with an extension, $e'$, which serves as a divider to part the grain and to hold the flowing grain back while the bundle is being bound. The binding-arm $e$ is attached to the rear end of the shaft $h$, which shaft is supported, as before stated, in the cross-heads O O' of the frame Q. These heads also support the shaft $g$, to which is attached the tripping compressing-arm $f$, also two or more detaining-fingers, $f'$, four being shown. The tripping compressing-arm $f$ holds the grain against the arm $e$, while the binding is being performed, and the detaining-arms $f'$ hold the grain from getting out of position.

The front end of the shaft N is provided with a gear-wheel, $n$, to which is attached the plate or disk $j$, which disk is provided with a pin, as shown at Figs. 24 and 28. Supported upon this plate is a pawl, $i$. (Shown in detail in Figs. 25, 26.) This pawl is provided with a guide-pin or friction-roller, $m$, which engages with the stops $l$ on the inner face of the disk P, which is made fast to the shaft. Its free end $i'$ is provided with a flange, or is widened, so as to engage with the clutch-tripping arm $x$. (See Fig. 1.) The other end is provided with a projection, $i''$, which acts as a stop, coming in contact with a hub on disk $j$, and prevents it from being thrown over or out of working position. The pawl $i$ is also held in position by the spring $i'''$ or its equivalent. The construction of the parts just described will be readily understood from Figs. 24, 25, 26, 27, 28.

The clutch-trip arm or lever $x$ is attached to the front end of the shaft $g$, and its free end comes against the free end or flange of the pawl $i$. The rotation of the shaft N throws the roller $m$ out of contact with the catches or lugs $l$ of the disks P, which disengages the gear-wheel $n$ from the shaft N and stops the movement of the train of wheels connected with it. The shaft N continues its revolution, while the other parts of the binding apparatus are at rest. The clutch-shipper arm $x$ is held up by the arm $x'$ and the spring connecting-link with the crank $e''$.

The spring connecting-link is shown in detail at Figs. 21 and 22. It is composed of a frame, $a'$, rods $a''$ $a''''$, screws and nuts $c'$ $c''$ $c'''$, which are supported in cross-plates $a'''$. The upper rod, $a''$, is provided with a spring, $b'$, which is adjusted by the nut $c'$. The frame $a'$ is provided with shoulders $b''''$, which limit the upward movement of the rod $a''$. The rod $a''''$ is provided with a spring, $b''$, which is adjusted by the nut $c'''$, which adjusts the spring and also the length of the coupling. The tension of the spring $b''$ can also be adjusted by the nut $c''$. The spring connecting-link above described subserves the function of permitting the clutch-trip lever $x$ to be operated with a yielding pressure, and at the same time gives compression to the bundle while permitting the compressor-arm $f$ to yield under the pressure of the packed grain. This is effected by making the upper spring, $b'$, of less power or tension than the lower spring, $b''$, so that the first movement of the compressor-arm $f$ causes the arm $x'$ to rise against the pressure or tension of the upper spring, $b'$, thereby depressing the opposite end of the clutch-trip arm. The yielding of the arm $f$ while the bundle is being compressed is, as above stated, permitted by the lower spring, $b''$, although it may sometimes be the case that both springs will be compressed in this movement, since it will not always happen that the upper spring is completely compressed when the lever is actuated to trip.

The wheel O is provided on its inner face with a miter-gearing engaging with the miter-wheel $r$, which rotates the shaft $s$ and the crank $t$. The shaft $s$ is supported in and by the frame Q and a sleeve or hub, $s'$. The crank $t$ drives the arm or link $u$, which link, at its opposite end, is connected with the fork $v$. The link $u$ is curved, as shown in Fig. 13, and is provided with a slot, $u'$, through which the pin $u''$ passes and supports the link. The object of the curve is to carry the fork $v$ back in a straight line. It is evident that the link $u$ may be made of a round rod having the same curve, and passed through a pivot-eye in the pin $u''$ or other device for that purpose, which construction dispenses with the slot $u'$ in the arm; but I prefer the form shown. The fork $v$ is spread or forked at its lower end, $v'$, and curved at its upper end, as shown in Fig. 13, which slides through a swivel or pivoted eye, $w$, in its back-and-forth movement. The swivel-eye $w$ is on the post D.

The shaft $h$ is provided at its front end with the arm or crank 41, to which is connected the double connecting-link 38 and 39, provided with an adjusting-screw, 40, for the adjustment of its length. The lower end of this adjustable connection is pivoted to the wheel $q$ by a wrist-pin. Through this connecting-link, arm, or crank 41 and shaft $h$ power and motion are communicated to the binding-arm $e$.

The wheel $h'$ is an idler, so far as the train of gear is concerned; but it is provided on its outer face with two pins or stops, $h''$. In the rotation of the wheel these pins strike against the arm $h'''$, which operates the tension-plate $s''$ of the cord-box, through the rod $h''''$, at proper intervals.

The tension device, as shown in Figs. 12, 17, is simply a spring working from below against an upper plate, the cord passing between the spring and plate. In the form shown in Fig. 13 the tension device has a hinged plate interposed between the spring and the fixed plate.

The wheel $q$ is provided on its inner face with an eccentric-groove or cam, 37, formed by the shoulder 36, Fig. 11. The cam-groove is so constructed with reference to the movement of the wheel that the compressor $f$ is held in place by means of a crank, $e''$, when the bundle is being bound, and thrown up when the bundle is ready to be discharged. The arm $e''$ is provided with a projecting roller, (shown in Fig. 18,) which operates in the groove 37, and its rear end is pivoted to the frame Q. (Shown also in Fig. 18.) This wheel drives the shaft $q'$, to which are attached the cam-wheels 24 25, (shown in Figs. 23 and 23ª,) which cam-wheels are located immediately beneath the receiving-platform, as shown in Fig. 9. Cam-wheel 24 carries the discharging-arm 27, which is pivoted thereto by the wrist-pin 26, and also operates bell-crank 15. (Shown in Fig. 29.) The discharging-arm 27 is provided with an extension or heel, 33, (shown in dotted lines in Figs. 3, 9,) which heel comes in contact with the stop 34, fixed to the receiving-platform, and is by such stop thrown out at the proper time to engage the bound bundle and move it away from the tying devices. The arm 27 is turned back out of the way by coming in contact with the bottom 42 of the slot in shield K', which, as the wheel revolves, crowds the arm in, it being free to turn on the wrist-pin or pivot 26. The disk 25 is attached to the rear end of the shaft $q'$, and has attached to it, by the wrist-pin 28, another discharging-arm, 29, which is provided with a heel or extension, and there connected by the pivot-pin 35, which passes through the spring 31 and the guide 32, said link having a pin, 33ª, between which and the guide 32 the coiled spring is arranged. This arrangement brings the arm 29 in contact with the bundle in unison with the arm 27, so that both act (one on each side of the cord) together in discharging the bundle after it is bound. Cam-wheel 25 has on its front face an eccentric-groove, in which the roller 16 (shown in Fig. 29) operates to move the bell-crank 15, and a gear-segment, $x^3$, which is at intervals brought into engagement with a pinion, 9, on the knotter-shaft. Fig. 23ª shows wheel 25, with its eccentric-groove $x^4$, in which wheel or roller 16 is received; and in Fig. 29 the wheel 25 is shown partly in section and partly in full lines.

The bell-crank 15 is connected by a pin with the sliding plate 17, which sliding plate is provided with the cord-guide 18 at one edge and the knife 44, Fig. 30, at the opposite edge. This sliding plate is operated by a cam-groove in wheel 25, (see Fig. 23ª,) operating on the friction-roller at the end of the bell-crank 15, Fig. 29.

The knotter head or frame 7, as shown in detail and enlarged in Figs. 29, 30, 31, is supported by the foot $y'$, upon the brace I, and is located between the disks or wheels 24 25. The bell-crank 13 is provided at its upper end with the pivot-dog 11, held in operative position by the spring 12. This dog 11 operates the disks 10, which carry the cord-holder 22, through the medium of the ratchet-wheels 23, Fig. 3, but these parts being of ordinary construction and operation, further explanation is not essential.

In operation, as the machine is drawn along, the cut grain falls upon the platform E, and is delivered to the binding-platform by the toothed chains F, where the packing-arms $a$ receive it, and they being in the working position shown in Fig. 9, the grain is by these carried forward beyond or behind the bend L′ of the guide arms or rods L, where it remains until a sufficient quantity is accumulated to press back the compressing-arm $f$. This pressing back of the compressing-arm $f$ brings down the front end of the clutch-tripping arm or crank $x$, disengaging it from the pawl $i$. The spring $i'''$ then forces the roller $m$ into engaging position with one of the projections $l$ of the disk P, which throws the train of gearing at the front of the machine into motion. As soon as the train of gearing is put in motion, the wheel $q$, by means of the links 38 39 and crank 41, rotates the shaft $h$, and brings down the binding-arm $e$ from the position shown in Fig. 9 to that shown in Fig. 3. As the binding-arm descends, it comes in contact with the crank 1 3, Fig. 4, which throws the tucker 5 in front of the binding-arm and into the space between the cord and binding-arm, formed by the curvature of the arm and straight line of the cord, the projecting plate K holding the grain up from off the cord at that point, and is then carried forward by the binding-arm to the knotting-hook, thus placing the cord in position for the knotter-hook to receive it, in which position the tucker then remains until the binding-arm recedes, when it is thrown back by the spring 4 against the stop 2. The said crank, tucker, spring, and stop are located on the under side of the plate K, and are guarded or protected against straws by a descending plate, 6, as the binding-arm passes through the slot in the plate K, on each side of which slot is arranged one of the projections $k$, which subserve the function of raising or lifting the grain at this point. The binding platform or table is usually made of sheet metal or other thin material, and the tucking-arm is located to operate underneath this table, leaving only the thickness of the table between the tucking-arm and the gavel to be bound, the result being that an insufficient space is left between the grain and the tucking-arm for the tucking-arm to act freely and clearly in carrying the binding-cord to the tying devices. The projection $k$, being located directly over where the tucker-arm operates, supports the gavel that much higher above the plane of operation of the tucking-arm, leaving a clear space for the movement of the arm without any liability of influence from the grain of the gavel. When the binding-arm $e$ descends to the position shown in Fig. 3, the link $d$ brings down the swinging-guide M, thus throwing the packing-arms out of contact with the grain without stopping their movements. When the binding-arm is in the position shown in Fig. 9, the tucker 1 3 5 returns to its normal position by means of the spring 4, and the same movement, through the link $d$, turns the guide-arms M upward, which brings the packing-fingers $a$ in contact with the grain.

It will be obvious from the foregoing explanation that the packing-fingers are continuously operated; but their action on the grain is intermittent, such fingers being automatically adjusted to and from the grain in such manner that while the latter is being bound the fingers do not engage or act on the grain.

When the binding-arm is in the position shown in Fig. 3, the gavel is compressed between the binding-arm and the compressor $f$, and when in this position, the gear-wheels being in operation, the knotter is put in motion, the knot tied, and the cord severed. At this point the discharging-arms 27 and 29 come in contact with the bundle and throw it out against the rear end L″ of the guide-rods, and carry it down toward or to the ground. If, by reason of tangled grain, a bundle should remain at the point where the discharging-fingers have left it, then upon the starting down of the binder-arm again the discharging-fork $v$ descends and carries the bundle back and out of the machine. This bundle-discharging fork is so timed by the crank $t$ that it does not strike the bundle until just before the second one is formed, so that in binding grain the bundle is usually out of the way before the fork descends, its object being to prevent the accumulation of bundles at the discharging-point by reason of tangled grain or defective operation of the other parts. While the compressing-arm is thrown back, the arm $x$ of the shaft $g$ is held down and the movement of the train continues. As soon as the compressor-arm is liberated from pressure by the discharge of the bundle, it is returned to the position shown in Fig. 9 by the spring-coupling connected with the arm. This movement of the arm $x'$ will throw up the arm $x$, so as to engage arm $x$ with the pawl $i$, and thereby throw its roller $m$ out of contact with the lug or projection $l$ of the disk P, which movement causes the train of gear to stop until it is again thrown out by pressure against the arm $f$. The binding-cord is brought from the cord-box R to the binding-arm, by means of screw-eyes, to hold it in any convenient position, and the tension device is so arranged and timed that the tension will be off when the binding-arm is up and the gavel is being formed, and it will be on when the binding-arm commences to descend. As the pins $h''$ of the wheel $h'$ pass from under the arm or lever $h'''$, the spring $s''$ of the tension device will be free to operate against the cord until again lifted by the pin $h''$, acting against the lever $h'''$, through the rod $h''''$, which connects it with the tension-spring $s''$, this arrangement of devices being timed to take off and put on the tension at proper intervals.

We have shown at 45, Fig. 2, a clearer, through which the fork $v\ v'$ passes when rising for its return movement. In passing through this clearer 45 any bundle or straws which may have adhered to the fork are stripped off, so as to keep the fork clear and clean. It will be seen from Fig. 2 that the outer or forward end of the butter S, with its operating shaft or roller is located in front of the cutter-bar near the inner end of the cutting apparatus and the platform E. This location of the fixed end of the butter causes it to act as a rotating divider, which carries or guides into the cutting apparatus any standing grain that may come in the way, keeping the platform and the cutting apparatus clear at this point, and dispensing with the necessity of using any other divider. It will be readily understood that the rotation of the divider gives it an improved action, and the action is still further improved by the cleats shown.

We have illustrated and described in this case packer devices, and means for continuously operating and intermittently moving the same to and from the grain; but the same is not claimed herein, as such constitutes the subject of an application filed by us May 19, 1881, Serial No. 33,713, of which this is a division.

Having thus described our invention, what we claim is—

1. The traveling and horizontally-swinging butter S, having its forward end at the inner divider-point and in front of the cutter-bar, whereby the machine is kept clear at that point, substantially as described.

2. The rotating and horizontally-swinging butter S, having its driving-roller S' located in front of the cutter-bar, and at or near the inner end of the same, whereby the butter and its driving-roller serve as a rotating divider, substantially as specified.

3. The combination of the swinging traveling butter with the carrying or grain platform, the fixed platform and packing-fingers $a$, substantially as set forth.

4. The combination of the compressing-finger $f$ with frame $a'$, having the springs $b\ b''$, shoulders $b'''$, rods $a''\ a''''$, and adjustable nuts $c'\ c''\ c'''$, all constructed and operating substantially as set forth.

5. The spring-connecting link, constructed substantially as described, and the compressing-finger $f$, in combination with the arms $x'$ and $e''$, substantially as and for the purpose specified.

6. The combination, with the shaft $g$, carrying the compressing-finger $f$, of a trip device to automatically size the bundle, a wheel, $q$, and a single link connecting the compressing-finger shaft and the said wheel, and provided with a spring or springs for actuating both the finger and the automatic bundle-sizing device, substantially as described.

7. The combination, with the shaft $g$, carrying the compressing-finger $f$, of a trip device for sizing the bundle, a driving-wheel, $q$, and a yielding link connecting the wheel and the compressing-finger shaft, and serving to actuate the latter and also the trip device, substantially as described.

8. The combination of the arm or crank $x$, the arm $x'$, shaft $g$, and compressing-finger $f$, with the adjustable spring-connecting link, whereby the required pressure against the compressing-finger is regulated for disengaging the arm $x$ from the pawl $i$, substantially as specified.

9. The combination of pivoted rotating bundle-discharging fingers 27 and 29 with a fixed shield, K', having slots 42, the inner edges of which serve to fold the fingers inward from the bundle, to strip them from the latter after it has been discharged from the binding-platform, substantially as described.

10. The combination of pivoted rotating bundle-discharging fingers, means whereby they are folded inward from the bundle, to strip them from the latter after it has been discharged from the binding-platform, and overhanging guide-rods for holding the bundle against the fingers and directing it downward toward the ground, substantially as described.

11. The discharging-arm 27, having the heel-extension 33, in combination with the disk 24 and stop 34, substantially as specified.

12. The discharging-arm 29, having the extension and pin 35, in combination with the disk 25, rod 30, the spring 31, and guide 32, substantially as described.

13. The yielding or spring-detaining fingers $f'$, in combination with the compressing-finger and shaft $g$, whereby the grain is kept in position without being compressed at the ends of the bundle, when compressed about the middle for binding, substantially as described.

14. The ejecting-fork $v$, in combination with the link or rod $u$, and the crank $t$, for discharging bundles which may have been held or caught, substantially as described.

15. The tucker-arm and binding-arm, in combination with the tucker-crank 13, and the slot $k''$, whereby the tucker is operated by the binding-arm, and the cord is brought up to the knotter, substantially as described.

16. The combination of the plate K, having the angular raised projection $k$ and slot $k''$, with tucking devices operating beneath the plate and under the projection $k$, whereby the bundle is raised and a portion of the strands of cord left clear between the grain and tucking-arm, for the tucking-arm to act upon and carry to the tying device, substantially as described.

17. The combination of the plate K, having the angular projection $k$ and slot $k''$, the tucker-arm 5, and tucking-crank 13, arranged to have the tucker-arm operated beneath the plate and directly under the projection and the binder-arm, whereby the bundle is raised and a portion of the strands of the cord left clear between the grain and tucking-arm, for the tucking-arm to act upon and carry to the trying device, substantially as described.

18. The horizontally-moving plate or bar 17, having the cord-guide 18 at its front edge and a cord-cutter, 44, at its back edge, in combination with the knotter 8, substantially as set forth.

19. The combination of the rubber spring 19 and adjusting-screws 20 with the jaw-roller 21, and the cord-holder 10, and knotter-jaw, 15 substantially as specified.

In testimony whereof we have hereunto set our hands in the presence of two subscribing witnesses.

C. WHITNEY.
WILLIAM W. MARSH.

Witnesses to C. Whitney:
J. A. RUTHERFORD,
JOS. L. COOMBS.

Witnesses to William W. Marsh:
A. M. STARK,
JAS. L. MILLER.